(12) United States Patent
Mabeck et al.

(10) Patent No.: US 8,089,687 B2
(45) Date of Patent: Jan. 3, 2012

(54) ELECTRO-OPTICAL DISPLAY SYSTEMS

(75) Inventors: Jeffrey T. Mabeck, Corvallis, OR (US);
Jong-Souk Yeo, Corvallis, OR (US);
Tim R. Koch, Corvallis, OR (US);
Gregg A. Combs, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/643,742

(22) Filed: Dec. 21, 2009

(65) Prior Publication Data

US 2011/0149376 A1  Jun. 23, 2011

(51) Int. Cl.
*G02B 26/00* (2006.01)
*G09G 3/34* (2006.01)

(52) U.S. Cl. ........................................ 359/296; 345/107
(58) Field of Classification Search .................. 359/296, 359/290, 245; 345/105, 107; 430/32; 204/600
See application file for complete search history.

(56) References Cited

U.S. PATENT DOCUMENTS

| | | |
|---|---|---|
| 3,668,106 A | 6/1972 | Ota |
| 3,806,893 A | 4/1974 | Ohnishi et al. |
| 3,850,627 A | 11/1974 | Wells et al. |
| 3,892,568 A | 7/1975 | Ota |
| 4,041,481 A | 8/1977 | Sato |
| 4,045,327 A | 8/1977 | Noma et al. |
| 4,068,927 A | 1/1978 | White |
| 4,071,430 A | 1/1978 | Liebert |
| 4,088,395 A | 5/1978 | Gigila |
| 4,123,346 A | 10/1978 | Ploix |
| 4,126,854 A | 11/1978 | Sheridon |
| 4,149,149 A | 4/1979 | Miki et al. |
| 4,203,106 A | 5/1980 | Dalisa et al. |
| 4,218,302 A | 8/1980 | Dalisa et al. |
| 4,305,807 A | 12/1981 | Somlyody |
| 4,408,202 A | 10/1983 | Fales |
| 4,418,346 A | 11/1983 | Batchelder |
| 4,430,648 A | 2/1984 | Togashi et al. |
| 4,450,440 A | 5/1984 | White |
| 4,522,472 A | 6/1985 | Liebert et al. |
| 4,648,956 A | 3/1987 | Marshall et al. |
| 4,726,662 A | 2/1988 | Cromack |
| 4,732,456 A | 3/1988 | Fergason et al. |
| 4,741,604 A | 5/1988 | Kornfeld |

(Continued)

FOREIGN PATENT DOCUMENTS

DE     4431441 C1     2/1996

(Continued)

OTHER PUBLICATIONS

Kishi, E. et al., "5.1: Development of In-Plane EPD", SID 2000 Digest, p. 24-27.

(Continued)

*Primary Examiner* — William Choi

(57) ABSTRACT

Electro-optical display systems are disclosed. An electro-optical display system may include a display volume containing a fluid having a plurality of colorant particles; a dielectric layer adjacent the display volume, the dielectric layer including recessed regions configured to contain the plurality of colorant particles; a plurality of electrodes configured to selectively move the plurality of colorant particles between a compacted position in which all or nearly all of the plurality of colorant particles are in the recessed regions, and a spread position in which all or nearly all of the plurality of colorant particles are spread across the display volume; and at least one color filter configured to absorb at least one wavelength of light.

20 Claims, 7 Drawing Sheets

U.S. PATENT DOCUMENTS

| | | | |
|---|---|---|---|
| 4,772,102 | A | 9/1988 | Fergason et al. |
| 4,824,208 | A | 4/1989 | Fergason et al. |
| 4,832,458 | A | 5/1989 | Fergason et al. |
| 5,057,244 | A | 10/1991 | Nitta et al. |
| 5,105,185 | A | 4/1992 | Nakanowatari et al. |
| 5,223,115 | A | 6/1993 | DiSanto et al. |
| 5,223,823 | A | 6/1993 | DiSanto et al. |
| 5,250,932 | A | 10/1993 | Yoshimoto et al. |
| 5,250,938 | A | 10/1993 | Disanto et al. |
| 5,254,981 | A | 10/1993 | DiSanto et al. |
| 5,293,528 | A | 3/1994 | DiSanto et al. |
| 5,302,235 | A | 4/1994 | DiSanto et al. |
| 5,304,439 | A | 4/1994 | DiSanto et al. |
| 5,315,312 | A | 5/1994 | DiSanto et al. |
| 5,345,251 | A | 9/1994 | DiSanto et al. |
| 5,359,346 | A | 10/1994 | DiSanto et al. |
| 5,389,945 | A | 2/1995 | Sheridon |
| 5,402,145 | A | 3/1995 | Disanto et al. |
| 5,412,398 | A | 5/1995 | DiSanto et al. |
| 5,460,688 | A | 10/1995 | DiSanto et al. |
| 5,467,107 | A | 11/1995 | DiSanto et al. |
| 5,499,038 | A | 3/1996 | DiSanto et al. |
| 5,561,443 | A | 10/1996 | Disanto et al. |
| 5,565,885 | A | 10/1996 | Tamanoi |
| 5,575,554 | A | 11/1996 | Guritz |
| 5,627,561 | A | 5/1997 | Laspina et al. |
| 5,684,501 | A | 11/1997 | Knapp et al. |
| 5,689,282 | A | 11/1997 | Wolfs et al. |
| 5,717,515 | A | 2/1998 | Sheridon |
| 5,729,663 | A | 3/1998 | Lin et al. |
| 5,739,801 | A | 4/1998 | Sheridon |
| 5,745,094 | A | 4/1998 | Gordon, II et al. |
| 5,786,875 | A | 7/1998 | Brader et al. |
| 6,130,774 | A | 10/2000 | Albert et al. |
| 6,177,921 | B1 | 1/2001 | Comiskey et al. |
| 6,225,971 | B1 | 5/2001 | Gordon, II et al. |
| 6,271,823 | B1 | 8/2001 | Gordon, II et al. |
| 6,323,989 | B1 | 11/2001 | Jacobson et al. |
| 6,574,034 | B1 | 6/2003 | Lin et al. |
| 6,577,433 | B1 | 6/2003 | Lin et al. |
| 6,639,580 | B1 | 10/2003 | Kishi et al. |
| 6,710,540 | B1 | 3/2004 | Albert et al. |
| 6,741,385 | B2 | 5/2004 | Ikeda et al. |
| 6,781,745 | B2 | 8/2004 | Chung et al. |
| 6,806,995 | B2 | 10/2004 | Chung et al. |
| 6,822,783 | B2 | 11/2004 | Matsuda et al. |
| 6,897,996 | B2 | 5/2005 | Ikeda et al. |
| 6,967,763 | B2 | 11/2005 | Fuji et al. |
| 7,034,987 | B2 | 4/2006 | Schlangen |
| 7,038,656 | B2 | 5/2006 | Liang et al. |
| 7,053,882 | B2 | 5/2006 | Weisbuch et al. |
| 7,116,466 | B2 | 10/2006 | Whitesides et al. |
| 7,123,238 | B2 | 10/2006 | Lin et al. |
| 7,230,751 | B2 | 6/2007 | Whitesides et al. |
| 7,277,219 | B2 | 10/2007 | Ikeda |
| 7,304,787 | B2 | 12/2007 | Whitesides et al. |
| 7,352,353 | B2 | 4/2008 | Albert et al. |
| 7,365,732 | B2 | 4/2008 | Matsuda et al. |
| 7,408,699 | B2 | 8/2008 | Wang et al. |
| 7,433,113 | B2 | 10/2008 | Chopra et al. |
| 7,440,159 | B2 | 10/2008 | Yang et al. |
| 7,443,570 | B2 | 10/2008 | Chopra et al. |
| 7,554,716 | B2 | 6/2009 | Kita et al. |
| 2003/0013238 | A1 | 1/2003 | Ogawa |
| 2005/0052402 | A1 | 3/2005 | Kitano et al. |
| 2005/0266590 | A1 | 12/2005 | Roh et al. |
| 2005/0285816 | A1 | 12/2005 | Glass |
| 2006/0087489 | A1 | 4/2006 | Sakurai et al. |
| 2007/0075941 | A1 | 4/2007 | Zhou et al. |
| 2007/0103428 | A1 | 5/2007 | Kazmaier et al. |
| 2007/0109622 | A1 | 5/2007 | Matsuda |
| 2007/0205979 | A1 | 9/2007 | Bigelow et al. |
| 2007/0268560 | A1 | 11/2007 | Chopra et al. |
| 2008/0100906 | A1 | 5/2008 | Iftime et al. |
| 2008/0117165 | A1 | 5/2008 | Machida et al. |
| 2008/0225374 | A1 | 9/2008 | Hayes et al. |
| 2008/0261159 | A1 | 10/2008 | Chopra et al. |
| 2008/0266646 | A1 | 10/2008 | Wilcox et al. |
| 2009/0015545 | A1 * | 1/2009 | Kato et al. ............... 345/107 |
| 2009/0103159 | A1 | 4/2009 | Cheng et al. |
| 2009/0122390 | A1 | 5/2009 | Liang et al. |
| 2009/0201570 | A1 * | 8/2009 | Frazier et al. ............ 359/296 |
| 2009/0232509 | A1 | 9/2009 | Heikenfeld et al. |
| 2010/0156780 | A1 * | 6/2010 | Jacobson et al. ......... 345/107 |

FOREIGN PATENT DOCUMENTS

| | | |
|---|---|---|
| DE | 19500694 A1 | 8/1996 |
| EP | 0361420 A2 | 4/1990 |
| EP | 0404545 A2 | 12/1990 |
| EP | 0443571 A2 | 8/1991 |
| EP | 0186710 B1 | 10/1992 |
| EP | 0684579 A2 | 11/1995 |
| EP | 0525852 B1 | 5/1996 |
| EP | 1370904 B1 | 7/2006 |
| EP | 1714186 B1 | 11/2007 |
| GB | 2306229 A | 4/1997 |
| JP | 55096922 A | 7/1980 |
| JP | 62058222 A | 3/1987 |
| JP | 64086116 | 3/1989 |
| JP | 60089081 | 3/1994 |
| JP | 7036020 | 2/1995 |
| JP | 9031453 | 2/1997 |
| JP | 10149118 A | 6/1998 |
| WO | 9217873 A1 | 10/1992 |
| WO | 9220060 A1 | 11/1992 |
| WO | 9221733 A1 | 12/1992 |
| WO | 9302443 A1 | 2/1993 |
| WO | 9304458 A1 | 3/1993 |
| WO | 9304459 A1 | 3/1993 |
| WO | 9305425 A1 | 3/1993 |
| WO | 9307608 A1 | 4/1993 |
| WO | 9317414 A1 | 9/1993 |
| WO | 9506307 A1 | 3/1995 |
| WO | 9507527 A1 | 3/1995 |
| WO | 9510107 A1 | 4/1995 |
| WO | 9735298 A1 | 9/1997 |
| WO | 9819208 A1 | 5/1998 |
| WO | 2005093508 A1 | 10/2005 |
| WO | 2006016302 A2 | 2/2006 |
| WO | 2007042950 A2 | 4/2007 |
| WO | 2008007300 A1 | 1/2008 |

OTHER PUBLICATIONS

Swanson, Sally A. et al, "5.2: High Performance Electrophoretic Displays", SID 2000 Digest, p. 29-31.

Lenssen, Kars-Michiel H. et al., "46.1: Invited Paper: Novel Design for Full-Color Electronic Paper", SID 2008 Digest, p. 685-688.

* cited by examiner

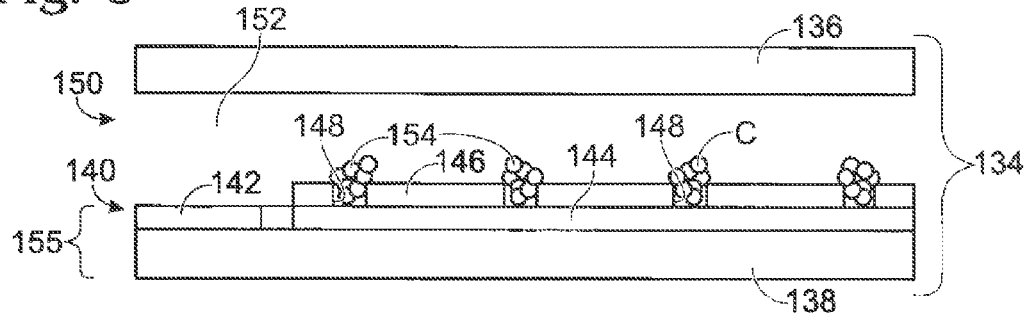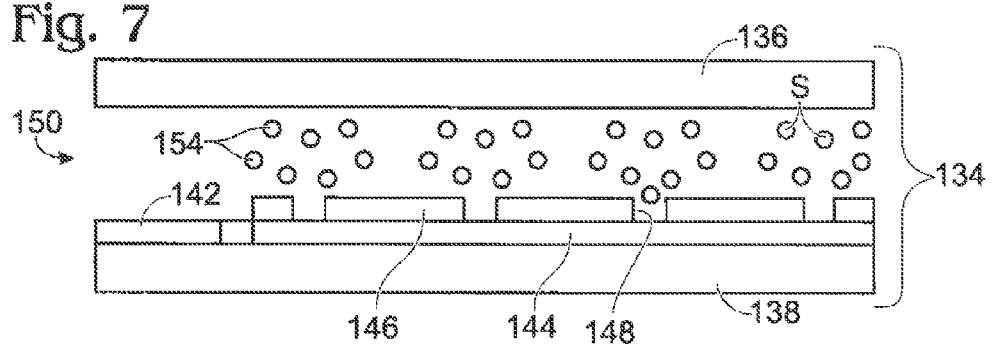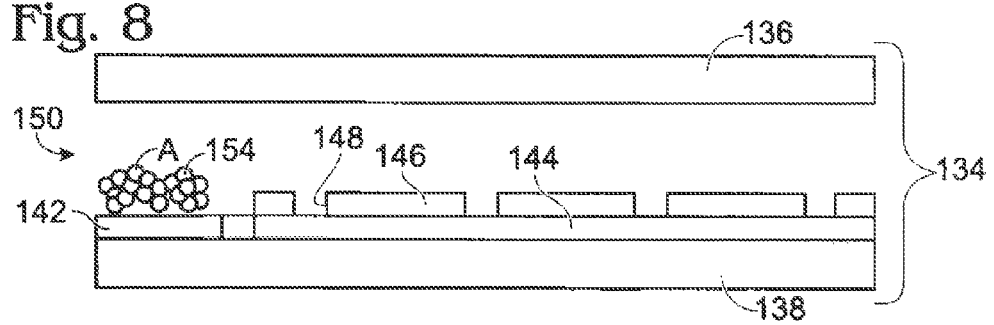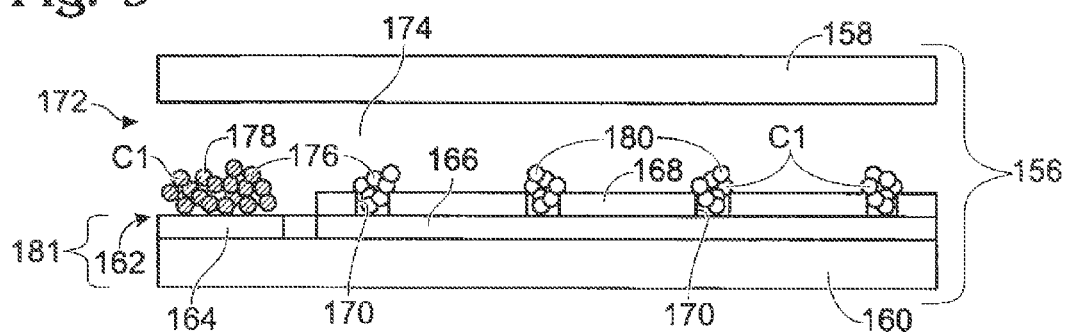

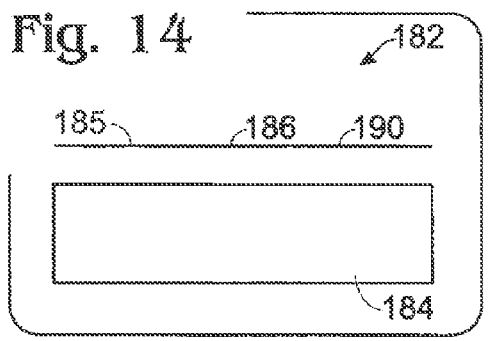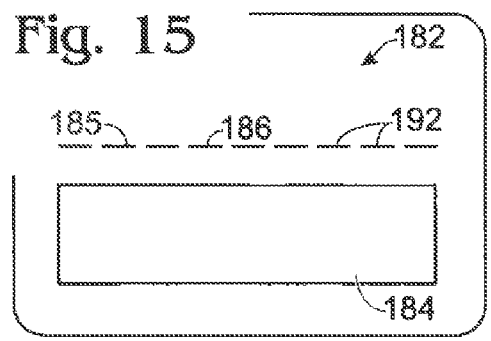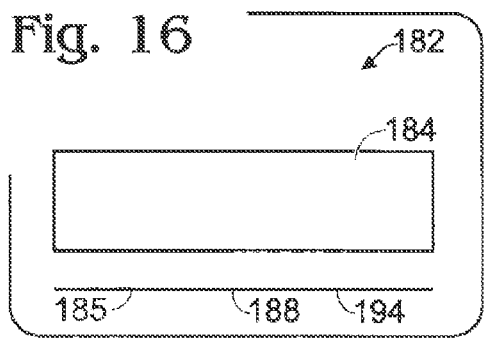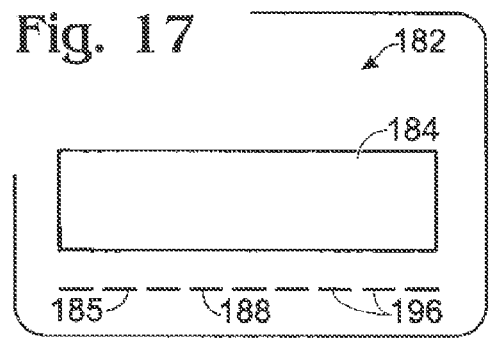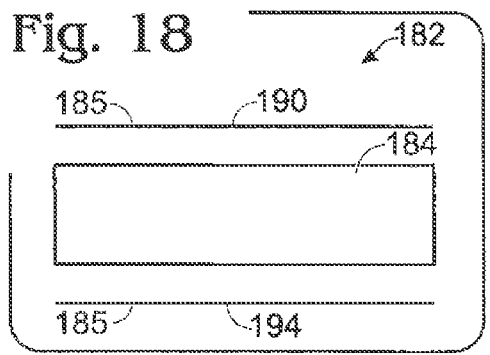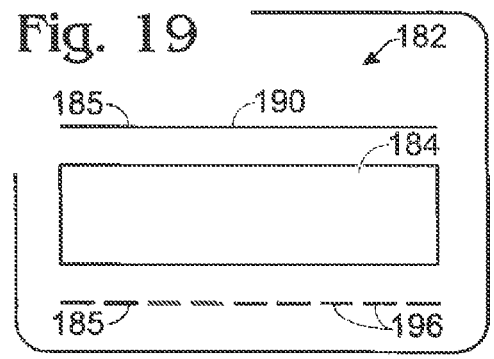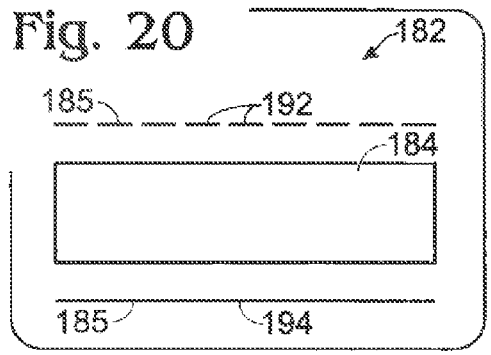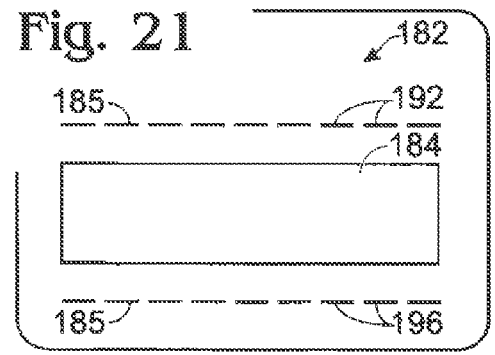

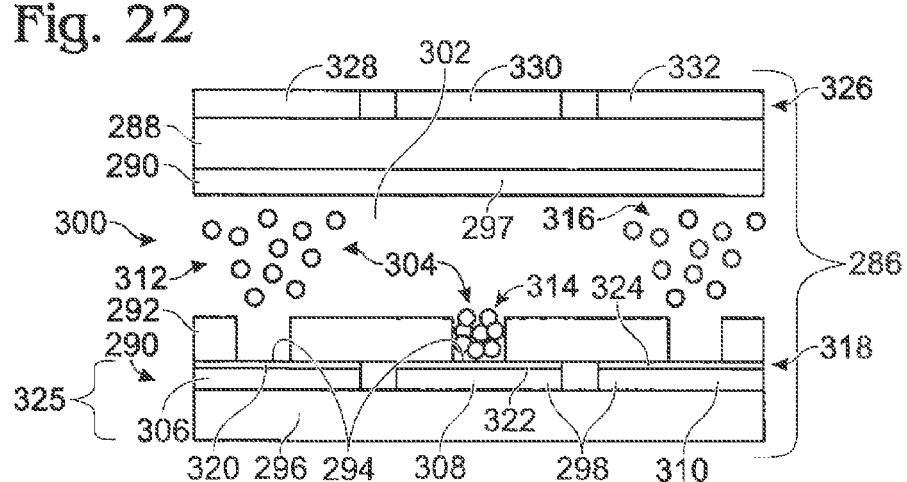
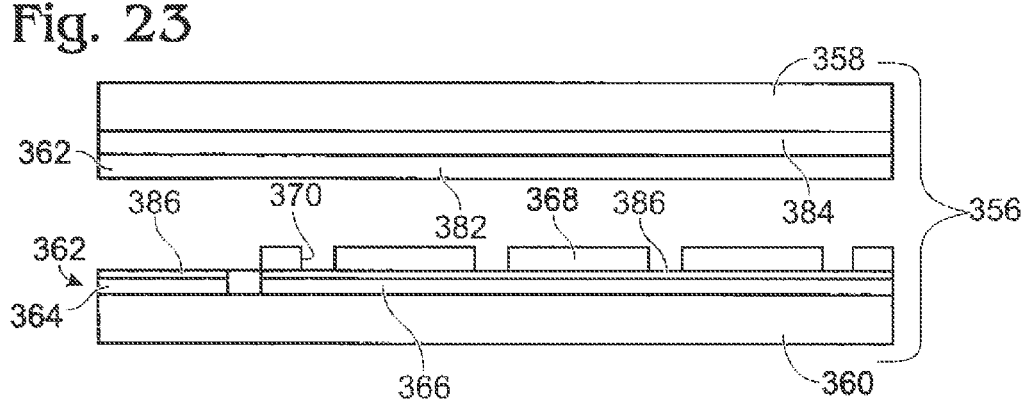

ELECTRO-OPTICAL DISPLAY SYSTEMS

BACKGROUND

Electrokinetic display systems are electro-optical information displays that form visible images using one or more of electrophoresis, electro-convection, electrochemical interaction and/or other electrokinetic phenomena. Those display systems may have a plurality of states, including a transparent (or clear) state and a colored (or dark) state. For example, electro-optical display systems that use electrophoretic phenomena to translate or move colorant particles may collect those particles at least substantially out of the viewing area of the display system to create a transparent state. The colorant particles also may be spread across the viewing area of the display to create a colored state.

BRIEF DESCRIPTION OF THE DRAWINGS

FIG. 6 is a block diagram of an example of the display element of FIG. 2, shown in a transparent state with coplanar electrodes and colorant particles compacted in recessed regions in accordance with an embodiment of the invention.

FIG. 7 is a block diagram of the display element of FIG. 6, shown in a colored state with colorant particles spread into a viewing area of the display system in accordance with an embodiment of the invention.

FIG. 8 is a block diagram of the display element of FIG. 6, shown in a transparent state with colorant particles adjacent one of the coplanar electrodes in accordance with an embodiment of the invention.

FIG. 9 is a block diagram of an example of the display element of FIG. 2, shown in a transparent state with coplanar electrodes, first colorant particles adjacent one of the coplanar electrodes, and second colorant particles compacted in recessed regions in accordance with an embodiment of the invention.

FIG. 14 is a block diagram of an example of the display element of FIG. 1, shown with an example of a filter in accordance with an embodiment of the invention.

FIG. 15 is a block diagram of the display element of FIG. 14, shown with another example of a filter in accordance with an embodiment of the invention.

FIG. 16 is a block diagram of the display element of FIG. 14, shown with an example of a reflector in accordance with an embodiment of the invention.

FIG. 17 is a block diagram of the display element of FIG. 14, shown with another example of a reflector in accordance with an embodiment of the invention.

FIG. 18 is a block diagram of the display element of FIG. 14, shown with the filter of FIG. 14 and the reflector of FIG. 16 in accordance with an embodiment of the invention.

FIG. 19 is a block diagram of the display element of FIG. 14, shown with the filter of FIG. 14 and the reflector of FIG. 17 in accordance with an embodiment of the invention.

FIG. 20 is a block diagram of the display element of FIG. 14, shown with the filter of FIG. 15 and the reflector of FIG. 16 in accordance with an embodiment of the invention.

FIG. 21 is a block diagram of the display element of FIG. 14, shown with the filter of FIG. 15 and the reflector of FIG. 17 in accordance with an embodiment of the invention.

FIG. 22 is a block diagram of an example of the display element of FIG. 4 or FIG. 5, shown with filters and reflectors in accordance with an embodiment of the invention.

FIG. 23 is a block diagram of the display element of FIG. 13, shown with coplanar and opposed electrodes, a filter and a reflector in accordance with an embodiment of the invention.

DETAILED DESCRIPTION

Figure 1:
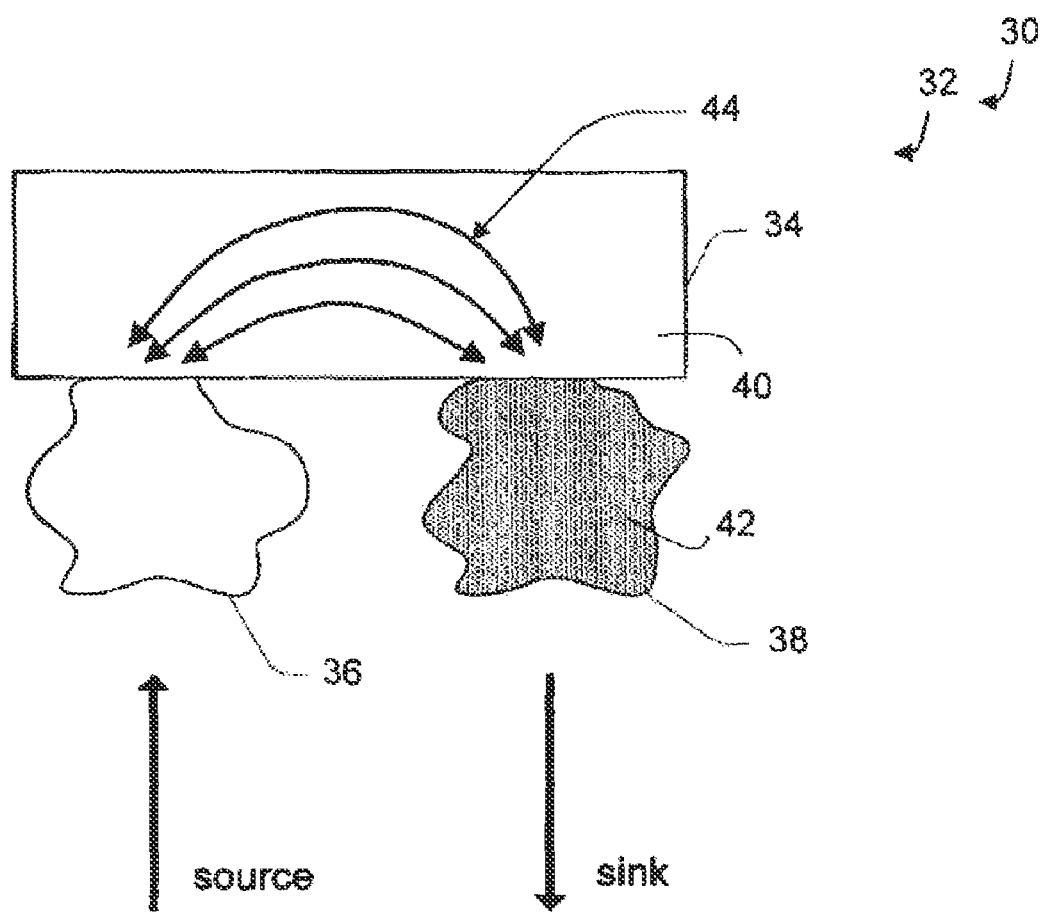
FIG. 1 is a block diagram of a display element of an electro-optical display system in accordance with an embodiment of the invention.

FIG. 1 shows an example of an electro-optical display system 30 having one or more display elements 32. Display element 32 may be a segment, a pixel, a sub-pixel, or a super-pixel having two or more pixels. Display element 32 may include a display volume 34, a source 36 and a sink 38. Display volume 34, source 36 and sink 38 may be fluidly connected and may contain a carrier fluid 40 having a plurality of colorant particles 42. Source 36 may include colorant particles 42 that may be selectively controlled to enter display volume 34. Sink 38 may receive colorant particles 42 from display volume 34. However, the roles of source 36 and sink 38 may be reversed during operation of display element 32. In other words, source 36 may become sink 38, and vice-versa. Flow lines 44 may illustrate movement of colorant particles 42 from source 36 to sink 38 with convective movement of carrier fluid 40.

Colorant particles 42 may have any suitable size, such as between several nanometers and several microns. Additionally, colorant particles 42 may have the property of changing the spectral composition of the incident light by absorbing and/or scattering certain portions of the spectrum. As a result, colorant particles 42 may appear colored which provides a desired optical effect. Carrier fluid 40 may have colorant particles 42 with a single color or may have two or more sets of colorant particles 42 with each set having a different color from the other sets. Although display system 30 is shown to include colorant particles 42, the display system may alternatively, or additionally, include one or more other suitable colorant technologies, such as dyed fluids, charged inks, oil films, etc.

The convective currents illustrated by flow lines 44 of display element 32 may lead to any suitable movement of colorant particles 42, such as out-of-plane movement (substantially transverse to substrate) as well as in-plane movement (substantially parallel to substrate), to provide the desired optical appearance. Additionally, the convective currents may be generated in one or more suitable ways. For example, the convective currents may be generated by unbalanced volumetric forces inside the fluids that cause different parts of carrier fluid 40 to move relative to each other. Additionally, the convective currents may occur under gravity if different parts of carrier fluid 40 have different density caused, for example, by localized heating.

Moreover, convective currents may be generated by pressure or concentration gradients inside carrier fluid 40 produced by localized chemical reactions, localized heating or other disturbances. Furthermore, convective currents may occur if there are ionic currents in carrier fluid 40 caused by external electric fields (AC or DC) and there is charge injection into the carrier fluid. The moving ions may then create a pressure gradient through viscous drag and excluded volume effects. Such convective currents may sometimes be referred to as "electro-convective currents." Although particular examples of generating the convective currents are described above, display system 30 may alternatively, or additionally, use any suitable physical principles to repel, attract, move, compress, concentrate or disperse colorants, such as electrokinetics, electrophoretics, electrowetting and electrofluidics.

Figure 2:
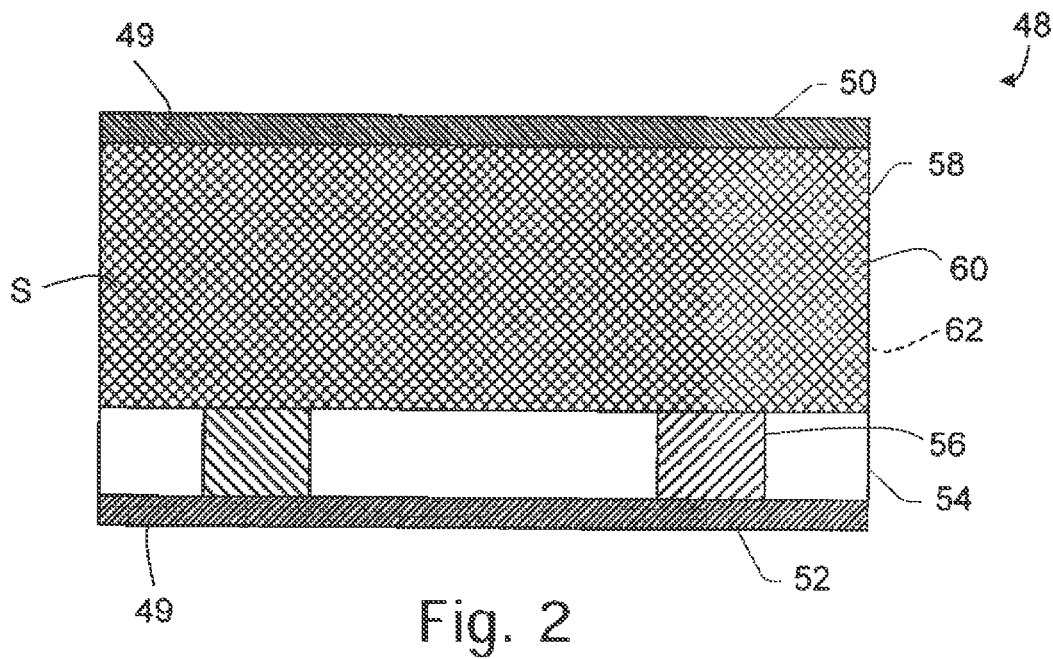
FIG. 2 is a block diagram of an example of the display element of the electro-optical display system of FIG. 1, shown in a colored state with opposed electrodes in accordance with an embodiment of the invention.
Figure 3:
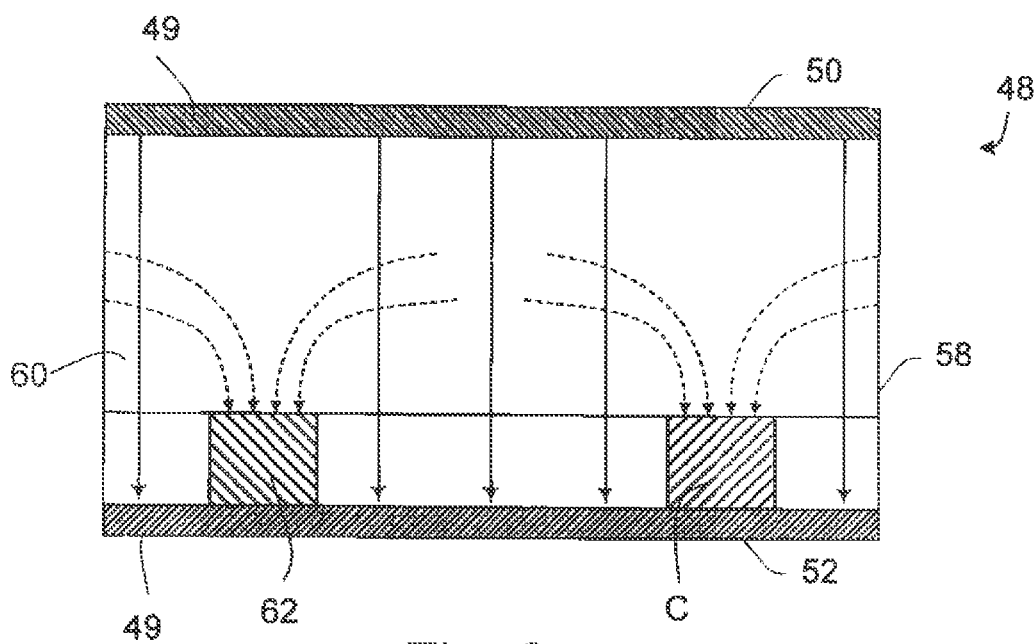
FIG. 3 is a block diagram of the display element of FIG. 2, shown in a transparent state with opposed electrodes in accordance with an embodiment of the invention.

FIGS. 2-3 illustrate an example of a display element 48 for electro-optical display system 30. Unless specifically excluded, display element 48 may include one or more components and/or one or more functions of the other display elements in this disclosure. Display element 48 may be a segment, a pixel, a sub-pixel, or a super-pixel having two or more pixels of electro-optical display system 30. Additionally, the layers of display element 48 shown in FIGS. 2-3 are for illustration only and may not represent the relative size or thickness of each layer. Display element 48 may include a plurality of electrodes 49, such as a first electrode 50 and a second electrode 52. First electrode 50 may be the conceptual "source" and may be made of transparent or opaque material(s), while second electrode 52 may be the conceptual "sink" and may be made of transparent or opaque material(s).

A dielectric layer 54 may be disposed, deposited or formed on second electrode 52. Dielectric layer 54 may be transparent. Alternatively, or additionally, dielectric layer 54 may include one or more colored dyes and/or one or more colorant particles. Dielectric layer 54 may include recessed regions 56, which may be any suitable size(s) and/or shape(s). For example, recessed regions 56 may be sized to contain a plurality of colorant particles of display element 48. Although dielectric layer 54 is shown to be formed on second electrode 52, the dielectric layer may alternatively, or additionally, be formed on first electrode 50.

First electrode 50 may be fixed a distance apart from dielectric layer 54 and second electrode 52 to define a display volume 58 that holds a carrier fluid 60 having a plurality of colorant particles 62. Carrier fluid 60 may include one or more polar fluids (e.g., water) and/or one or more non-polar fluids (e.g., dodecane). Additionally, or alternatively, carrier fluid 60 may include one or more anisotropic fluids, such as liquid crystal. Carrier fluid 60 also may include one or more surfactants (such as salts), charging agents, stabilizers, and dispersants. Carrier fluid 60 may include one or more dyed fluids, which may have a color different from the color of colorant particles 62.

First and second electrodes 50, 52 may be configured to selectively move plurality of colorant particles 62 between a spread position S (as shown in FIG. 2) in which all or nearly all of the plurality of colorant particles may be out of recessed regions 56 and/or distributed or spread across display volume 58 to absorb and/or scatter incident light thereby creating a colored optical appearance ("colored state"), and a compacted position C (as shown in FIG. 3) in which all or nearly all of plurality of colorant particles 62 may be in recessed regions 56 thereby producing a clear optical appearance ("transparent state").

For example, first and second electrodes 50, 52 may apply an electric potential difference, which may result in moving plurality of colorant particles 62 to compacted position C. Transverse solid lines of arrows in FIG. 3 may indicate electric field lines, while dashed lines of arrows leading into recessed regions 56 may indicate the flow of plurality of colorant particles 62 following the electrostatic and convective flows. To switch display element 48 from the clear state to the dark state, the polarity of the voltage may be reversed. That reversal may induce convective flow in the opposite direction and colorant particles 62 may no longer be electrically contained in recessed regions 56. As a result, plurality of colorant particles 62 may be mass transported to display volume 58 and then may spread relatively evenly throughout the display volume.

The convective flow may be induced by ionic mass transport in carrier fluid 60 and charge transfer between the carrier fluid and the electrodes. The charge transfer may occur when carrier fluid 60 is coupled to the electrodes either through direct contact with the electrodes or separated from the electrodes by an intermediate layer comprising one or more materials. In the latter case, charge transfer may be facilitated by the internal electrical conductivity of the intermediate layer, either volumetric or via pinholes and other defects.

Alternatively, the convective flow may be a transient effect caused by the ionic mass transport in carrier fluid 60, but without charge transfer between the carrier fluid and the electrode. In this case, the convective flow may proceed for a finite amount of time and may facilitate the compaction of colorant particles 62 in recessed regions 56. After that colorant particles 62 may be contained in recessed regions 56 by electrostatic forces generated by a coupling with the electrodes. Convection within display element 48 may also be induced by other means. For example, convective flow can be induced by an electrokinetic means, a mechanical means (e.g., mechanical pistons), temperature gradients (e.g., heating of the sources and sinks, focused radiation), chemical potential gradients, as well as other means.

Figure 4:
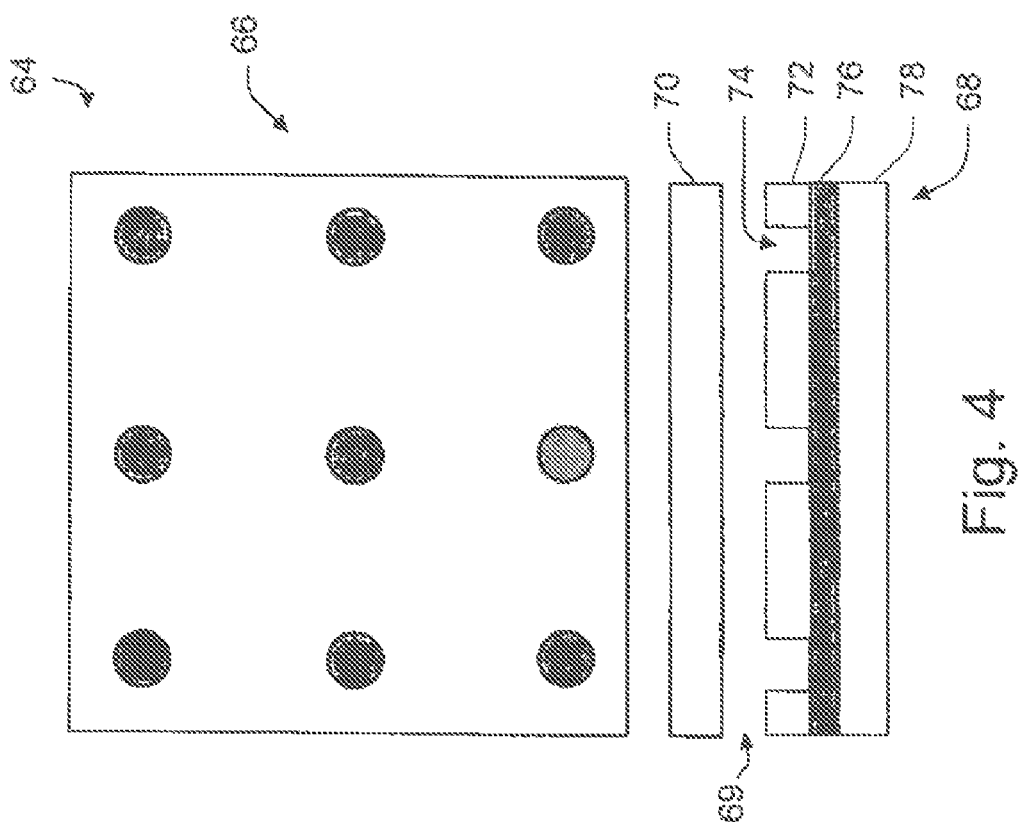
FIG. 4 is a block diagram of an example of the display element of FIG. 2, showing a dot structure in accordance with an embodiment of the invention.

FIG. 4 shows an example of a display element, which is generally indicated at 64, having a dot structure for the recessed regions. Unless specifically excluded, display element 64 may include one or more components and/or one or more functions of the other display elements in this disclosure. Additionally, the layers of display element 64 shown in FIG. 4 are for illustration only and may not represent the relative size or thickness of each layer. FIG. 4 shows a top view 66 and a cross-sectional view 68 of display element 64. Display element 64 may be a segment, a pixel, a sub-pixel, or a super-pixel having two or more pixels of electro-optical display system 30.

Display element 64 may include a display volume 69 defined by a first electrode 70, a dielectric layer 72 having a plurality of recessed regions 74, a second electrode 76 and a substrate 78. As shown in FIG. 4, recessed regions 74 may be shaped as dots and may be periodically distributed. Each dot-shaped recess region patterned into dielectric layer 72 may connect display volume 69 to second electrode 76. Display element 64 also may include another substrate (not shown) on which first electrode 70 is disposed. Although recessed regions 74 are shown to be periodically distributed, the recessed regions may alternatively, or additionally, be aperiodically or stochastically distributed.

Figure 5:
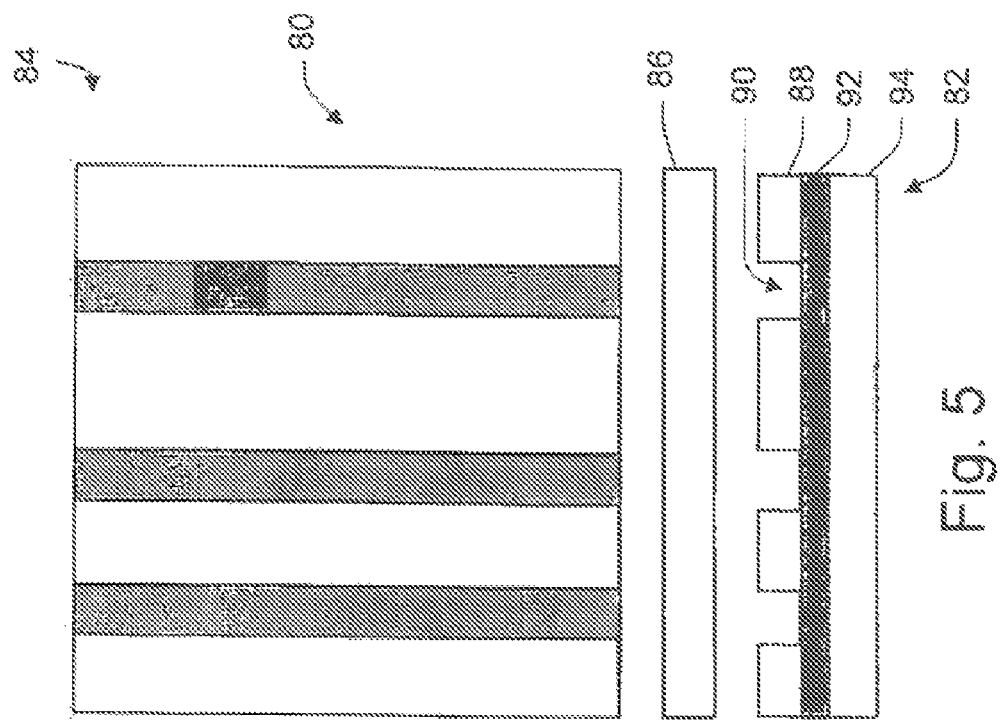
FIG. 5 is a block diagram of an example of the display element of FIG. 2, showing a line structure in accordance with an embodiment of the invention.

Additionally, although recessed regions 74 are shown to be in the form of dots, the recessed regions may alternatively, or additionally, include any suitable shape(s). For example, FIG. 5 shows a top view 80 and a cross-sectional view 82 of a display element 84 having a dielectric layer with recessed regions that are in the form of lines or linear channels, which may be periodically or aperiodically distributed. Unless specifically excluded, display element 84 may include one or more components and/or one or more functions of the other display elements in this disclosure. Additionally, the layers of display element 84 shown in FIG. 5 are for illustration only and may not represent the relative size or thickness of each layer. Display element 84 may include a first electrode 86, a dielectric layer 88 having a plurality of recessed regions 90, a second electrode 92 and a substrate 94. Additionally, display element 84 may include another substrate (not shown) on which first electrode 86 is disposed.

FIGS. 6-8 show another example of a display element, generally indicated at 134, for electro-optical display system 30. Display element 134 may be a segment, a pixel, a sub-pixel, or a super-pixel having two or more pixels of electro-optical display system 30. Unless specifically excluded, display element 134 may include one or more components and/or one or more functions of the other display elements in this disclosure. Additionally, the layers of the display element shown in FIGS. 6-8 are for illustration only and may not represent the relative size or thickness of each layer.

Display element 134 may include a first substrate 136, a second substrate 138 and a plurality of coplanar electrodes 140. Plurality of coplanar electrodes 140 may include any suitable number of coplanar electrodes. For example, plurality of coplanar electrodes 140 may include a first coplanar electrode 142 and a second coplanar electrode 144. Additionally, coplanar electrodes 140 may be any suitable size(s). For example, first coplanar electrode 142 may be smaller than second coplanar electrode 144, or vice-versa.

A dielectric layer 146 having recessed regions 148 may be disposed on at least one of coplanar electrodes 140. For example, dielectric layer 146 may be disposed or formed on second coplanar electrode 144. First substrate 136, the coplanar electrodes and dielectric layer 146 may define a display volume 150 that holds or contains a carrier fluid 152 having a plurality of colorant particles 154. Carrier fluid 152 may be a clear or dyed fluid, and plurality of colorant particles 154 may be any suitable color. Additionally, colorant particles 154 shown in FIGS. 6-8 are for illustration only and may not reflect the actual number of colorant particles in display element 134 or the size of the colorant particles relative to each other or to the layers of the display element.

Coplanar electrodes 140 may be configured to selectively move plurality of colorant particles 154 between compacted position C (as shown in FIG. 6) in which all or nearly all of the plurality of colorant particles may be in recessed regions 148, and spread position S (as shown in FIG. 7) in which all or nearly all of the plurality of colorant particles may be out of the recessed regions and/or distributed or spread across display volume 150 relative to the compacted position (and collected position as described below). For example, when the colorant particles are negatively charged, first electrode 142 may have a negative polarity and second electrode 144 may have a positive polarity to move colorant particles 154 to compacted position C. To move those particles to spread position S, first and second electrodes 142, 144 may provide the opposite bias (such as a positive bias for the first electrode and/or a negative bias for the second electrode), a pulsed bias and/or a pulsed waveform.

Coplanar electrodes 140 may additionally be configured to move plurality of colorant particles 154 to a collected position A (as shown in FIG. 8) in which all or nearly all of the plurality of colorant particles may be collected adjacent one of the coplanar electrodes, such as first coplanar electrode 142, and spaced from the other coplanar electrodes, such as second coplanar electrode 144. For example, when colorant particles 154 are negatively charged, first coplanar electrode 142 may have a positive polarity and second coplanar electrode 144 may have a negative polarity to move colorant particles 154 to collected position A. Colorant particles 154 may alternatively be positively charged and the polarities discussed above may be reversed to move those particles accordingly. Display element 134 may include a backplane 155, as shown in FIG. 6, which may include plurality of coplanar electrodes 140 and/or second substrate 138.

FIGS. 9-12 show another example of a display element, generally indicated at 156, for electro-optical display system 30. Display element 156 may be a segment, a pixel, a sub-pixel, or a super-pixel having two or more pixels of electro-optical display system 30. Unless specifically excluded, display element 156 may include one or more components and/or one or more functions of the other display elements in this disclosure. Additionally, the layers of display element 156 shown in FIGS. 9-12 are for illustration only and may not represent the relative size or thickness of each layer. Moreover, the colorant particles shown in FIGS. 9-12 are for illustration only and may not reflect the actual number of colorant particles in the display element or the size of the colorant particles relative to each other or to the layers of display element 156.

Display element 156 may include a first substrate 158, a second substrate 160 and a plurality of coplanar electrodes 162. Plurality of coplanar electrodes 162 may include any suitable number of coplanar electrodes. For example, plurality of coplanar electrodes 162 may include a first coplanar electrode 164 and a second coplanar electrode 166. Additionally, coplanar electrodes 162 may be any suitable size(s). For example, first coplanar electrode 164 may be smaller than second coplanar electrode 166, or vice-versa.

A dielectric layer 168 having recessed regions 170 may be disposed on at least one of coplanar electrodes 162. For example, dielectric layer 168 may be disposed or formed on second electrode 166. First substrate 158, coplanar electrodes 162 and dielectric layer 168 may define a display volume 172 that holds or contains a carrier fluid 174 having a plurality of colorant particles 176. Carrier fluid 174 may be a clear or dyed fluid. Plurality of colorant particles 176 may include first colorant particles 178 having a first color, and second colorant particles 180 having a second color different from the first color. The first and second colors may be any suitable colors, such as black and magenta, magenta and cyan, cyan and yellow, green and magenta, or any other suitable combinations, including combinations of red, green, blue, cyan, magenta, yellow, white and/or spot color(s).

Figure 10:
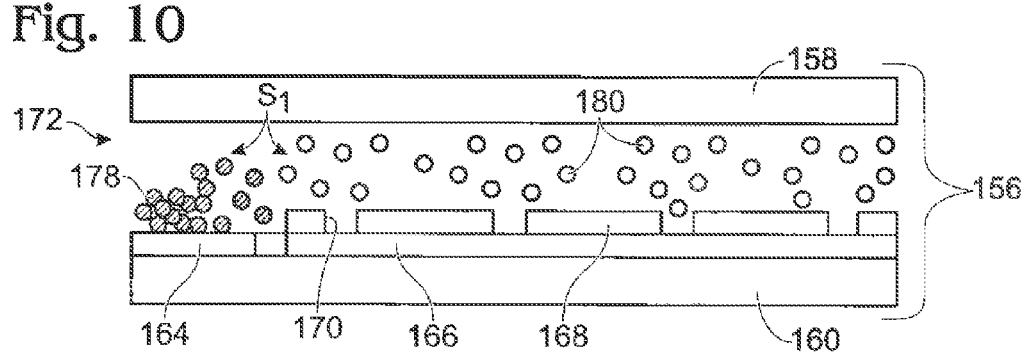
FIG. 10 is a block diagram of the display element of FIG. 9, shown in a colored state with the first colorant particles adjacent one of the coplanar electrodes and the second colorant particles spread into a viewing area of the display element in accordance with an embodiment of the invention.
Figure 11:
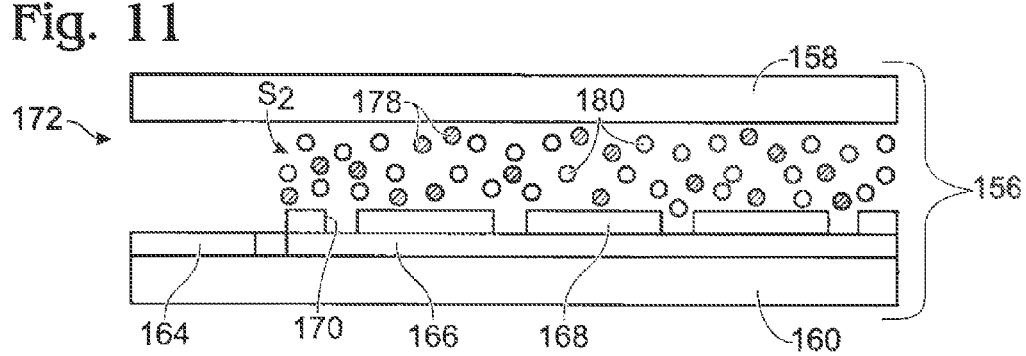
FIG. 11 is a block diagram of the display element of FIG. 9, shown in a colored state with first and second colorant particles spread into the viewing area of the display system in accordance with an embodiment of the invention.

Coplanar electrodes 162 may be configured to selectively move plurality of colorant particles 176 among a first compacted position C1 (as shown in FIG. 9) in which all or nearly all of first colorant particles 178 may be adjacent first electrode 164 and all or nearly all of second colorant particles 180 may be in recessed regions 170, a first spread position S1 (as shown in FIG. 10) in which all or nearly all of the second colorant particles may be out of the recessed regions and/or all or nearly all of the second colorant particles may be distributed or spread across display volume 172 relative to the first compacted position (and the second compacted position as described below), and a second spread position S2 (as shown in FIG. 11) in which all or nearly all of the second colorant particles may be out of the recessed regions and/or all or nearly all of the first and second colorant particles may be distributed or spread across the display volume relative to the first compacted position (and the second compacted position as described below).

For example, when first colorant particles 178 are positively charged and second colorant particles 180 are negatively charged, first electrode 164 may have a negative polarity and second electrode 166 may have a positive polarity to move colorant particles 176 to first compacted position C1. To move those particles to the spread position(s), first and second electrodes 164, 166 may provide the opposite bias (such as a positive bias for the first electrode and/or a negative bias for the second electrode), a pulsed bias and/or a pulsed waveform. Asymmetric travel distances for first and second colorant particles 178, 180 may be used for independent control of those particles. For example, the colorant particles adjacent to the smaller electrode, such as first electrode 164, may respond slower to an applied bias due to travel distance of those particles from the smaller electrode to display volume 172. First and second colorant particles 178, 180 may thus move to first spread position S1, as shown in FIG. 10, on an initial application of a bias, and then may move to second spread position S2, as shown in FIG. 11, on a continued or second application of a bias.

Figure 12:
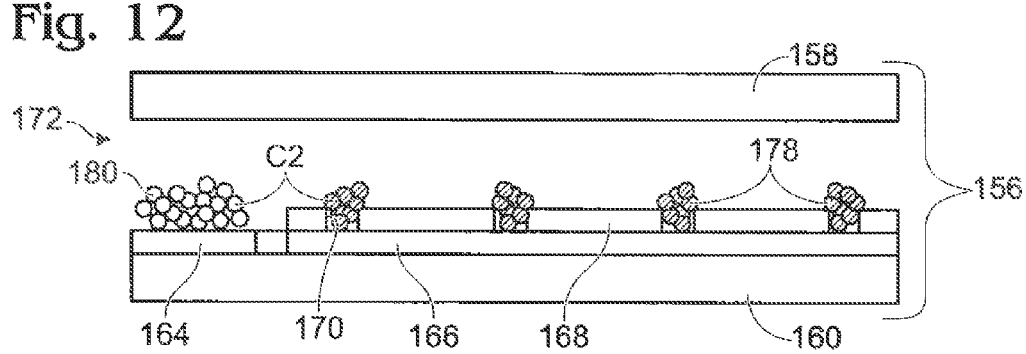
FIG. 12 is a block diagram of the display element of FIG. 9, shown in a transparent state with first colorant particles compacted in recessed regions and second colorant particles adjacent one of the coplanar electrodes in accordance with an embodiment of the invention.

Coplanar electrodes 162 may additionally be configured to move plurality of colorant particles 176 to a second compacted position C2 in which all or nearly all of second colorant particles 180 may be adjacent first electrode 164 and all or nearly all of the first colorant particles may be in recessed regions 170 (as shown in FIG. 12). For example, when first colorant particles 178 are positively charged and second colorant particles 180 are negatively charged, first electrode 164 may have a positive polarity and second electrode 166 may have a negative polarity to move colorant particles 176 to second compacted position C2. First and second colorant particles 178, 180 may alternatively be negatively and positively charged, respectively, and the polarities discussed above may be reversed to move those particles accordingly.

Display element 156 may include a backplane 181, as shown in FIG. 9, which may additionally include plurality of coplanar electrodes 162 and/or second substrate 160. Although colorant particles 176 are shown to include particles of two different colors, the colorant particles may alternatively include particles of three, four, five or more different colors.

Figure 13:
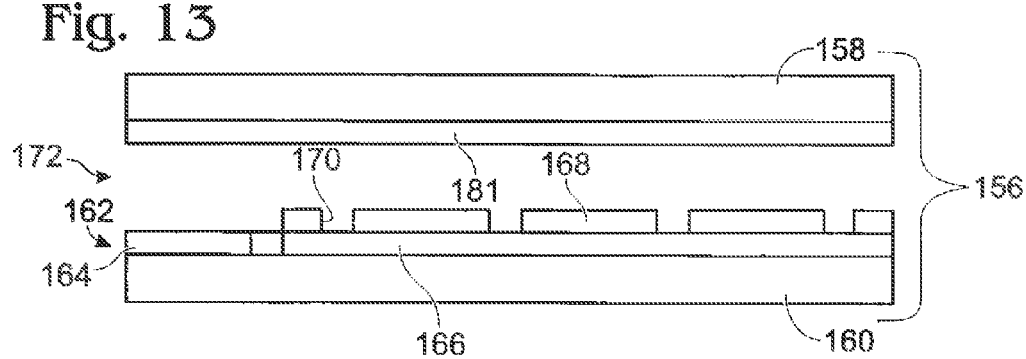
FIG. 13 is a block diagram of the display element of FIG. 6 or FIG. 9 shown with coplanar electrodes and an opposed electrode in accordance with an embodiment of the invention.

Display element 156 (or display element 134) may include additional structure discussed in this disclosure. For example, although that display element is shown to include only coplanar electrodes, the display element may include one or more electrodes that are not within the same plane as the coplanar electrodes, such as at least one opposed electrode 181, as shown in FIG. 13. Opposed electrode 181 and coplanar electrodes 162 may be configured to move all or nearly all of the colorant particles out of and/or into the recessed regions, such as rate(s) faster than with only the coplanar electrodes. For example, opposed electrode 181 may serve as a reference electrode to build up potential between coplanar electrodes 162.

FIGS. 14-21 show examples of a display element for electro-optical display system 30, generally indicated at 182. Display element 182 may be a segment, a pixel, a sub-pixel, or a super-pixel having two or more pixels of electro-optical display system 30. Unless specifically excluded, display element 182 may include one or more components and/or one or more functions of the other display elements in this disclosure. Additionally, the layers of display element 182 shown in FIGS. 14-21 are for illustration only and may not represent the relative size or thickness of each layer.

Display element 182 may include a display volume 184 and one or more color elements 185, which may include any suitable structure configured to modulate at least one wavelength of light. For example, color elements 185 may include one or more filters 186 and/or one or more reflectors 188. Although display element 182 may include other components, such as electrodes, substrates, colorant particles, fluids, dielectric layers, etc., those components are not shown to primarily illustrate the different combinations of colorant particles, filters and/or reflectors that may be used with a display element for an electro-optical display system that may be used to create various color embodiments.

Display element 182 may include a single filter 186, generally indicated at 190 in FIG. 14. Filter 190 may be any suitable color, such as red, green, blue, cyan, magenta, yellow, white, spot color(s) (color(s) matched to specific application (s)), a color different from the color of the colorant particles and/or fluid, and/or other suitable color(s). Alternatively, display element 182 may include a plurality of filters 192 (also may be referred to as a "segmented filter" or "pixelated filter"), as shown in FIG. 15. Those filters may be any suitable colors, such as red, blue, green, cyan, magenta, yellow and/or white filters.

Display element 182 also may include a single reflector 188, generally indicated at 194 in FIG. 16. Reflector 194 may be configured to reflect at least one wavelength of light. For example, reflector 194 may be configured to reflect the wavelengths of light corresponding to the color white (may be referred to as a "white reflector"). Alternatively, reflector 194 may be configured to reflect the wavelengths of light corresponding to the color red, blue, green ("a red reflector," "a blue reflector" and "a green reflector," respectively), cyan, magenta, yellow, white, spot color(s) and/or other suitable color(s). Alternatively, display element 182 may include a plurality of reflectors 196 (also may be referred to as a "segmented reflector" or "pixelated reflector"), as shown in FIG. 17. Reflectors 196 may be any suitable colors, such as one or more of the colors discussed above for reflector 194.

Display element 182, such as shown in FIGS. 14, 15, 16 and/or 17, may be configured with different transparent and colored states by using different colorant particles, different filters and/or different reflectors. For example, display element 182 may switch between a spot color and a white color by using colorant particles having the spot color and a white reflector 194 (or segmented white reflector 196). Additionally, display element 182 may switch between first and second colors by using colorant particles with a third color (where the third color combined with the first color results in the second color) and reflector 194 (or segmented reflector 196) configured to reflect the first color. Moreover, display element 182 may provide full color by various color reflectors 196, such as reflectors that reflect the color red, green, blue, white, cyan, magenta, yellow, and/or spot color(s).

Display element 182 may alternatively include both filter 186 and reflector 188. For example, display element 182 may include filter 190 and reflector 194, as shown in FIG. 18. Alternatively, display element 182 may include filter 190 and segmented reflector 196, as shown in FIG. 19. Display element 182, such as shown in FIG. 18 or 19, may be configured with different transparent and colored states by using different colorant particles, different filters and/or different reflectors. For example, display element 182 may switch between a spot color and a black color by using a spot color filter 190 and a white reflector 194 (or segmented white reflector 196) with black colorant particles. Additionally, display element 182 may switch between first and second colors by using a filter 190 with the first color, colorant particles with a third color (where the third color combined with the first color results in the second color), and a white reflector 194 (or segmented white reflector 196).

Display element 182 may alternatively include segmented filter 192 with reflector 194, as shown in FIG. 20. Alternatively, display element 182 may include segmented filter 192 and segmented reflector 196, as shown in FIG. 21. Display element 182, such as shown in FIGS. 20-21, may be configured with different transparent and colored states by using different colorant particles, different filters and/or different reflectors. For example, display element 182 may provide full color by using various color filters 192, such as red, green, blue and white filters, and a white reflector 194 (or segmented white reflector 196). Further variations of the above also are possible by using a transparent dielectric layer, a dyed dielectric layer or a dielectric layer with colorant particles.

The combinations of filters and reflectors shown above for display element 182 may be incorporated with any of the other display elements described in this disclosure. For example, a display element 286 is shown in FIG. 22. Display element 286 may be a segment, a pixel, a sub-pixel, or a super-pixel having two or more pixels of electro-optical display system 30. Unless specifically excluded, display element 286 may include one or more components and/or one or more functions of the other display elements in this disclosure. Additionally, the layers of display element 286 shown in FIG. 22 are for illustration only and may not represent the relative size or thickness of each layer. Moreover, the colorant particles shown in FIG. 22 are for illustration only and may not reflect the actual number of colorant particles in the display element or the size of the colorant particles relative to each other or to the layers of the display element.

Display element 286 includes a first substrate 288, a plurality of electrodes 290, a dielectric layer 292 having recessed regions 294, and a second substrate 296. Plurality of electrodes 290 includes a first opposed electrode 297 and coplanar electrodes 298. Plurality of electrodes 290 and dielectric layer 292 defines a display volume 300 that holds or contains a carrier fluid 302 having a plurality of colorant particles 304. Coplanar electrodes 290 include pixel plate electrodes. Those electrodes may sometimes be referred to as a segmented or pixelated second electrode 298.

For example, segmented second electrode 298 includes a first segment 306, a second segment 308 and a third segment 310. Those segments are electrically disconnected such that each segment has a different electrical polarity than an adjacent segment. For example, plurality of colorant particles 304 may be negatively charged and may include a first portion 312, a second portion 314 and a third portion 316. First and third segments 306, 310 may be negatively charged to move first and third portions 312, 316 of colorant particles 304 to the spread position, while second segment 308 may be positively charged to move second portion 314 of the colorant particles to the compacted position, as shown in FIG. 22.

Segmented second electrode 298 includes at least one reflector or reflector layer 318. Reflector layer 318 is configured to reflect at least one wavelength of light, such as when plurality of colorant particles 304 are in recessed regions 294 and/or display element 286 is in the transparent or clear state.

For example, reflector layer 318 may include a white reflector layer that is configured to reflect the wavelengths of light corresponding to the color white. Alternatively, reflector layer 318 may include one or more non-white reflector layers that may be configured to reflect the wavelengths of light corresponding to the color red, blue, green, cyan, magenta, yellow, white, spot color(s) and/or other suitable color(s).

When the second electrode is segmented, such as segmented second electrode 298, one or more of the segments includes a reflector layer. For example, first segment 306 includes a first reflector layer 320, second segment 308 includes a second reflector layer 322, and third segment 310 includes a third reflector layer 324. First, second and/or third reflector layers 320, 322, 324 are configured to reflect wavelengths of light corresponding to the same or different colors. For example, each of those reflector layers may be configured to reflect wavelengths of light corresponding to any suitable color, such as the color white. Alternatively, first, second, and third reflector layers 320, 322, 324 may be configured to reflect wavelengths of light corresponding to the colors red, blue and green. Display element 286 includes a backplane 325 (such as an active matrix backplane) that includes coplanar electrodes (or segmented second electrode) 298 and/or second substrate 296.

Although second electrode 298 is shown to be segmented or pixelated, first electrode 297 may alternatively, or additionally, be segmented or pixelated. Additionally, although second electrode 298 is shown to include three segments, the second electrode may include any suitable number of segments, such as two, four, five, six, seven, etc. For example, segmented second electrode 298 may include four or more segments each with a reflector layer configured to reflect wavelengths of light corresponding to the colors red, blue, green or white. Moreover, although colorant particles 304 are discussed to be negatively charged, those particles may be positively charged. Furthermore, although a single recess region is shown above each segment, there may be two or more recess regions per segment. Additionally, although segmented second electrode 298 is shown to include a reflector layer, first electrode 297 and/or dielectric layer 292 may alternatively include or incorporate the reflector layer.

Display element 286 also includes at least one filter 326, which may include any suitable structure configured to absorb at least one wavelength of light. Filter 326 is formed or incorporated on top of the first substrate and/or between the first substrate and the first electrode. Filter 326 may be a color filter of any suitable color(s), such as red, blue, green, white, cyan, magenta, yellow, any suitable spot color(s) and/or any other color(s). Display element 286 may include, for example, a first filter 328, a second filter 330 and a third filter 332, as shown in FIG. 22. Those filters may be any suitable size(s). Each filter may include a different color, such as red, blue and green. Additionally, display element 286 may include a color filter for each electrode, such as shown in FIG. 22 for each segment of segmented second electrode 298. Reflector 318 and filter 326 may be generally referred to as color elements of display element 286.

Although display element 286 is shown to include three filters, the display element may include any suitable number of filters, such as one, two, four, five or more filters. Additionally, although display element 286 is shown to include red, blue and green filters, those filters may include any suitable color(s), such as cyan, magenta, yellow, white, spot color(s), color(s) different from the color of the colorant particles, and/or red, blue, green and white colors. Moreover, although display element 286 is shown to include a filter for each segmented electrode, there may be more than one filter for each segmented electrode or more than one segmented electrode for each filter. For example, display element 286 may include a single color filter of any suitable color.

Another example of a display element for electro-optical display system 30 with filter(s) and/or reflector(s) is generally indicated at 356 in FIG. 23. Display element 356 may be a segment, a pixel, a sub-pixel, or a super-pixel having two or more pixels of electro-optical display system 30. Unless specifically excluded, display element 356 may include one or more components and/or one or more functions of the other display elements in this disclosure. Additionally, the layers of display element 356 shown in FIG. 23 are for illustration only and may not represent the relative size or thickness of each layer.

Display element 356 may include a first substrate 358, a second substrate 360 and a plurality of coplanar electrodes 362. Plurality of coplanar electrodes 362 may include any suitable number of coplanar electrodes. For example, plurality of coplanar electrodes 362 may include a first coplanar electrode 364 and a second coplanar electrode 366. Additionally, coplanar electrodes 362 may be any suitable size(s). For example, first coplanar electrode 364 may be smaller than second coplanar electrode 366, or vice-versa.

A dielectric layer 368 having recessed regions 370 may be disposed or formed on at least one of coplanar electrodes 362. For example, dielectric layer 368 may be disposed or formed on second electrode 366. Additionally, display element 356 may include at least one opposed electrode 382. Alternatively, or additionally, display element 356 may include at least one color filter 384 and/or at least one reflector layer 386, as shown in FIG. 23. Filter 384 may be any suitable color(s), and reflector layer 386 may reflect any suitable color(s).

Although at least some of the display elements above are shown to include a plurality of electrodes, the display elements may alternatively, or additionally, include electrokinetic elements, heating elements, microfluidic elements, micro-electromechanical elements, etc.

We claim:

1. An electro-optical display system, comprising:
a display volume containing a fluid having a plurality of colorant particles;
a dielectric layer adjacent the display volume, the dielectric layer including recessed regions configured to contain the plurality of colorant particles;
a plurality of electrodes including coplanar electrodes, the plurality of electrodes configured to selectively move the plurality of colorant particles between a compacted position in which all or nearly all of the plurality of colorant particles are in the recessed regions, and a spread position in which all or nearly all of the plurality of colorant particles are spread across the display volume; and
at least one color filter configured to absorb at least one wavelength of light,
wherein the display volume containing the fluid extends uninterrupted over the coplanar electrodes.

2. The system of claim 1, further comprising at least one color reflector configured to reflect at least one wavelength of light, the display volume being disposed between the at least one color filter and the at least one color reflector.

3. The system of claim 1, further comprising a backplane that includes the coplanar electrodes.

4. The system of claim 1, wherein the plurality of electrodes further includes at least one electrode opposed to the coplanar electrodes.

5. The system of claim 1, wherein at least one of the fluid and the dielectric layer includes one or more colored dyes.

6. The system of claim 1, further comprising a transparent substrate, the fluid being disposed between the transparent substrate and the coplanar electrodes.

7. An electro-optical display system, comprising:
a display volume containing a fluid having a plurality of colorant particles;
a dielectric layer adjacent the display volume, the dielectric layer including recessed regions configured to contain the plurality of colorant particles;
a plurality of electrodes including coplanar electrodes, the plurality of electrodes configured to selectively move the plurality of colorant particles between a compacted position in which all or nearly all of the plurality of colorant particles are in the recessed regions, and a spread position in which all or nearly all of the plurality of colorant particles are spread across the display volume; and
at least one color filter configured to absorb at least one wavelength of light,
wherein the plurality of colorant particles includes first colorant particles having a first color, and second colorant particles having a second color different from the first color.

8. An electro-optical display system, comprising:
a plurality of coplanar electrodes;
a display volume containing a fluid having a plurality of colorant particles; and
a dielectric layer disposed on at least one electrode of the plurality of coplanar electrodes, the dielectric layer including recessed regions configured to contain the plurality of colorant particles, wherein the plurality of coplanar electrodes is configured to selectively move the plurality of colorant particles among (i) a compacted position in which all or nearly all of the plurality of colorant particles are in the recessed regions, (ii) a collected position in which all or nearly all of the plurality of colorant particles are out of the recessed regions, collected adjacent to at least one electrode of the plurality of coplanar electrodes, and spaced from other electrodes of the plurality of coplanar electrodes, and (iii) a spread position in which all or nearly all of the plurality of colorant particles are spread across the display volume relative to the compacted and collected positions.

9. The system of claim 8, wherein the plurality of coplanar electrodes includes first and second electrodes, the first electrode being smaller than the second electrode and the dielectric layer being disposed on the second electrode.

10. The system of claim 8, further comprising at least one opposed electrode, the display volume being disposed between the at least one opposed electrode and the plurality of coplanar electrodes.

11. The system of claim 8, further comprising a transparent substrate and at least one color filter on the transparent substrate, the fluid being disposed between the transparent substrate and the plurality of coplanar electrodes.

12. The system of claim 8, wherein at least one electrode of the plurality of coplanar electrodes is configured to reflect one or more wavelengths of light.

13. The system of claim 8, further comprising a backplane that includes the plurality of coplanar electrodes, wherein the plurality of coplanar electrodes includes pixel plate electrodes.

14. The system of claim 8, further comprising a backplane that includes the plurality of coplanar electrodes.

15. An electro-optical display system, comprising:
a transparent substrate;
at least one electrode disposed on the transparent substrate;

a backplane including a plurality of pixel plate electrodes;

at least one color element configured to modulate at least one wavelength of light;

a dielectric layer disposed on one of the at least one electrode and the plurality of pixel plate electrodes, the dielectric layer including recessed regions configured to contain the plurality of colorant particles; and a display volume disposed between the transparent substrate and the backplane, the display volume containing a fluid having a plurality of colorant particles, wherein the at least one electrode and the plurality of pixel plate electrodes are configured to selectively move the plurality of colorant particles between a compacted position in which all or nearly all of the plurality of colorant particles are in the recessed regions, and a spread position in which all or nearly all of the plurality of colorant particles are spread across the display volume, wherein the display volume containing the fluid extends uninterrupted over the plurality of pixel plate electrodes.

16. The system of claim 15, wherein the at least one color element includes at least one of red, green, blue, cyan, magenta, yellow, white and spot color filters.

17. The system of claim 15, wherein the at least one color element includes at least one of red, green, blue, cyan, magenta, yellow, white and spot color reflectors.

18. The system of claim 15, wherein each of the plurality of pixel plate electrodes is spaced from the other pixel plate electrodes.

19. The system of claim 15, wherein the display volume is disposed between the at least one electrode disposed on the transparent substrate and the plurality of pixel plate electrodes.

20. An electro-optical display system, comprising:

a display volume containing a fluid having a plurality of colorant particles;

a dielectric layer adjacent the display volume, the dielectric layer including recessed regions configured to contain the plurality of colorant particles;

a plurality of electrodes including coplanar electrodes, the plurality of electrodes configured to selectively move the plurality of colorant particles between a compacted position in which all or nearly all of the plurality of colorant particles are in the recessed regions, and a spread position in which all or nearly all of the plurality of colorant particles are spread across the display volume; and at least one color filter configured to absorb at least one wavelength of light, wherein the coplanar electrodes include first and second electrodes, the first electrode being smaller than the second electrode.

* * * * *